United States Patent
Nakabayashi et al.

(10) Patent No.: US 8,591,085 B2
(45) Date of Patent: Nov. 26, 2013

(54) OPTICAL FIBER LIGHT SOURCE APPARATUS

(75) Inventors: Hitoshi Nakabayashi, Hyogo (JP); Akihisa Morimoto, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/555,847

(22) Filed: Jul. 23, 2012

(65) Prior Publication Data
US 2013/0020925 A1    Jan. 24, 2013

(30) Foreign Application Priority Data
Jul. 22, 2011    (JP) .................. 2011-160536

(51) Int. Cl.
*B60Q 1/00* (2006.01)
(52) U.S. Cl.
USPC ........... 362/548; 362/551; 362/560; 362/418; 362/429; 362/285
(58) Field of Classification Search
USPC ......... 362/511, 554, 556, 581, 551–552, 558, 362/560, 632–634, 544, 546, 548, 217.1, 362/217.11–217.17, 362–375, 418, 429, 362/285, 293
See application file for complete search history.

(56) References Cited

U.S. PATENT DOCUMENTS

| | | | | |
|---|---|---|---|---|
| 4,234,910 A | * | 11/1980 | Price | 362/105 |
| 5,343,368 A | * | 8/1994 | Miller | 362/572 |
| 5,838,860 A | * | 11/1998 | Kingstone et al. | 385/100 |
| 6,201,915 B1 | * | 3/2001 | Rizkin et al. | 385/115 |
| 6,382,824 B1 | * | 5/2002 | Prasad et al. | 362/551 |
| 6,616,317 B2 | * | 9/2003 | Feinbloom et al. | 362/580 |
| 6,881,964 B2 | * | 4/2005 | Holmes | 250/492.1 |
| 7,331,699 B2 | * | 2/2008 | Gawalkiewicz et al. | 362/648 |

FOREIGN PATENT DOCUMENTS

JP   2010-040340 A    2/2010
JP   2010218774 A  *  9/2010

* cited by examiner

*Primary Examiner* — Anne Hines
*Assistant Examiner* — Jose M Diaz
(74) *Attorney, Agent, or Firm* — Rader, Fishman & Grauer PLLC

(57) ABSTRACT

An optical fiber light source apparatus, includes a casing, a discharge lamp accommodated inside the casing, a concave reflection mirror, which holds the discharge lamp, and an optical fiber, which receives light from the reflection mirror. The concave reflection mirror, to which the discharge lamp is fixed, is held by a holding member, which has an approximately rectangular flange portion in a front face thereof and a regulating concave portion formed in a side of the flange portion. A guide is provided on the casing in a direction perpendicular to an optical axis, so that the flange portion of the holding member is slidably engaged with the guide. A pressing member, which is pressed with a bias force toward the regulating concave portion of the flange and engages with the regulating concave portion, is provided on the guide, thereby securing the concave reflection mirror.

12 Claims, 6 Drawing Sheets

25a
(25)

24a
(24)

25b
(25)

24a
(24)

OPTICAL FIBER LIGHT SOURCE APPARATUS

CROSS-REFERENCES TO RELATED APPLICATION

This application claims priority from Japanese Patent Application Serial No. 2011-160536 filed Jul. 22, 2011, the contents of which are incorporated herein by reference in its entirety.

BACKGROUND

1. Technical Field

The present invention relates to an optical fiber light source apparatus in which light is emitted from an optical fiber, and a discharge lamp serves as a light source, and particularly relates to an optical fiber light source apparatus having a concave reflection mirror in which a discharge lamp is built.

2. Related Art

An optical fiber light source is known, in which radiation light from a discharge lamp is condensed by a concave reflection mirror, and the condensed light is guided to the outside by an optical fiber, so that a workpiece may be irradiated therewith. For example, refer to Japanese Patent Application Publication No. 2010-040340. A schematic view of such known technology is shown in FIG. 6. A light source 31, which is made up of a discharge lamp 32 and a concave reflection mirror 33 for condensing light from the discharge lamp 32, is arranged inside a casing 30. A light guiding unit 34 is arranged on a light emitting side of the light source 31, that is, a side of an opening of the concave reflection mirror 33, and a light receiving end portion 35a of an optical fiber 35 is arranged on a light emitting side of the light guiding unit 34. The concave reflection mirror 33, the light guiding unit 34, and the light receiving end portion 35a of the optical fiber 35 are arranged so that the optical axes thereof are aligned with one another. Light emitted from the discharge lamp 32 is condensed by the concave reflection mirror 33, and the condensed light passes through the light guiding unit 34 so as to enter the light receiving end portion 35a of the optical fiber 35.

Replacement of such a discharge lamp used for the light source apparatus is required at the end of its life span. In such case, the discharge lamp and the concave reflection mirror are replaced together as a module in order to make replacement easy. The discharge lamp and the concave reflection mirror are taken out together by opening an opening-and-closing door provided in the casing, and thus the replacement can be performed easily (the discharge lamp may then be removed from the concave reflection mirror once they are outside the casing). However, although it is possible to arrange the lamp and the reflection mirror in advance so that optical axes thereof are aligned with each other, if replacement of such a lamp is repeated, the optical axis of the replaced lamp and those of the light guiding unit and the fiber light receiving end are shifted from each other, so that the luminance of the light emitted from the optical fiber decreases.

Although such an optical fiber light source apparatus is initially configured so that the second focal point of the concave reflection mirror may be located at a light receiving unit end surface of the optical fiber, the position of the lamp and that of the reflection mirror are shifted from each other every time such a lamp is replaced, so that the position of the second focal point of the reflection mirror also shifts therefrom, whereby the condensing efficiency with respect to the optical fiber decreases. Since such an optical fiber is very thin, it is necessary to position them with sufficient accuracy in order to position the second focal point of the concave reflection mirror with respect to the end surface of the optical fiber. It is desired that an operator, who performs replacement of such lamp, can attach it easily and precisely without being concerned about positioning the lamp.

SUMMARY

In view of the background, it is an object of the present invention to offer a structure of an optical fiber light source apparatus which is made up of a casing, a discharge lamp accommodated inside the casing, a concave reflection mirror holding the discharge lamp, and an optical fiber receiving light from the reflection mirror, wherein the reflection mirror and the optical fiber can be easily and precisely positioned with respect to each other, when the reflection mirror, in which the discharge lamp is installed, is attached to the casing.

In order to solve the above problem, in the optical fiber light source apparatus according to the present invention, the concave reflection mirror, to which the discharge lamp is fixed, is held by a holding member having an approximately rectangular flange portion on a front face thereof, a regulating concave portion being formed on a side of the flange portion, guides being provided on the casing in a direction perpendicular to an optical axis thereof, the flange portion of the holding member being slidably engaged with the guides, and a pressing member, which is pressed by a bias force toward the regulating concave portion of the flange portion and engages the regulating concave portion, being provided on one of the guides.

In the optical fiber light source apparatus according to the present invention, when the concave reflection mirror, into which the discharge lamp is installed, is attached to the casing, the discharge lamp and the optical fiber can be precisely positioned with respect to each other by a simple operation, in which the flange portion of the holding member holding the reflection mirror is engaged with the guides provided in the casing, whereby light from the discharge lamp may be very efficiently introduced into the optical fiber.

BRIEF DESCRIPTION OF THE DRAWING

Other features and advantages of the present optical fiber light source apparatus will be apparent from the ensuing description, taken in conjunction with the accompanying drawings, in which.

DETAILED DESCRIPTION

Figure 1:
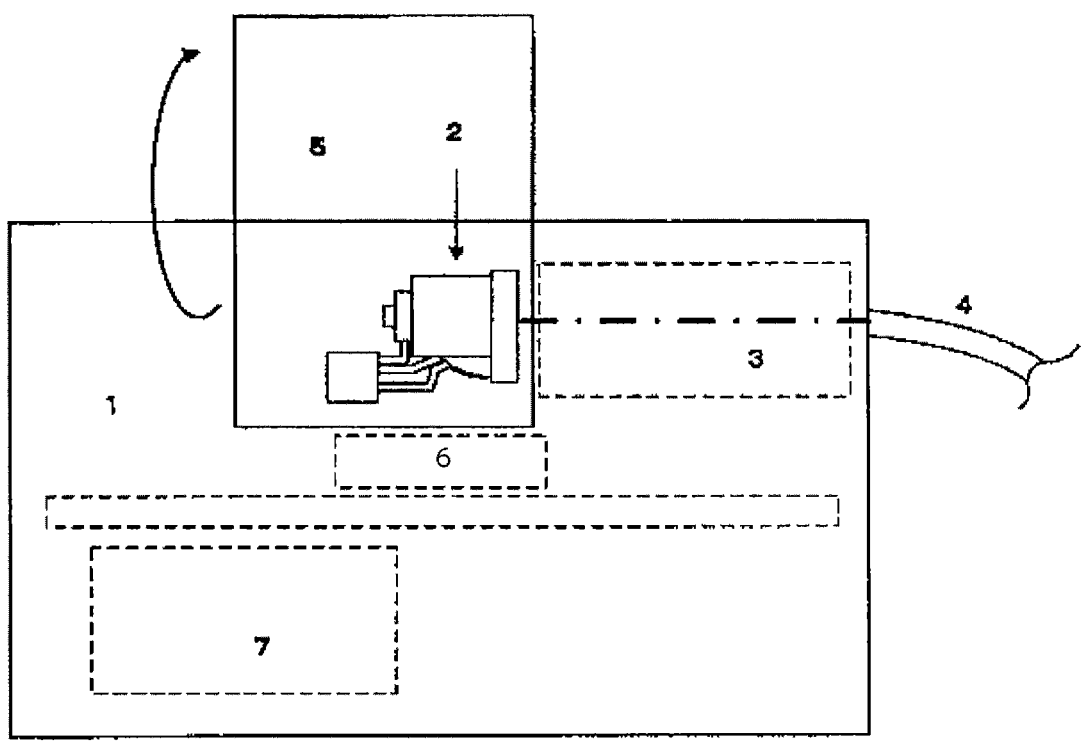
FIG. 1 is a schematic overall view of an optical fiber light source apparatus according to the present invention.

As shown in FIG. 1, a lamp unit 2, a cylindrical light guiding unit 3, and a light receiving end portion 4a of an optical fiber 4 are attached to the inside of a housing 1. The lamp unit 2 can be removed from the housing 1 to the outside by opening and closing an opening-and-closing door 5 of the housing 1. A cooling fan 6 is provided under the lamp unit 2, to cool down the lamp. Moreover, an electric component part 7 is arranged at a lower portion of the housing 1.

Figure 2A:
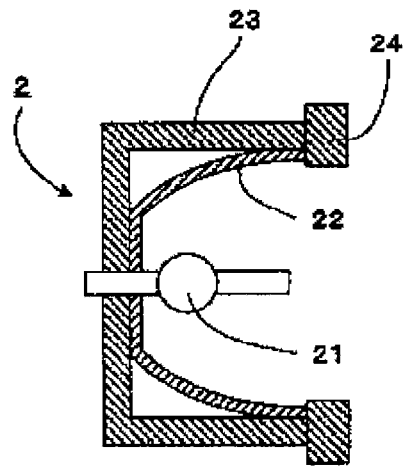
FIGS. 2A, 2B and 2C are explanatory diagrams of a lamp unit of an optical fiber light source apparatus according to the present invention.
Figure 2B:
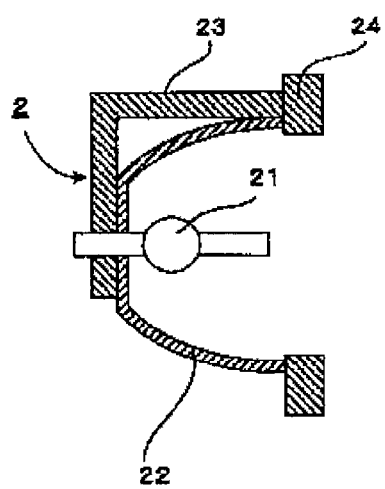
Figure 2C:
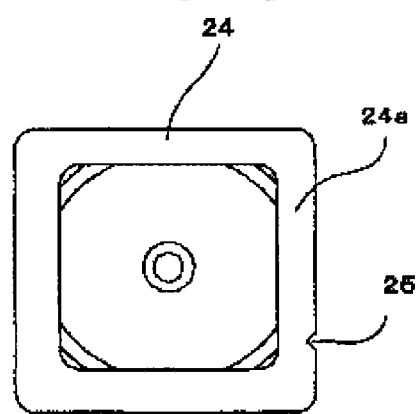
Figure 3A:
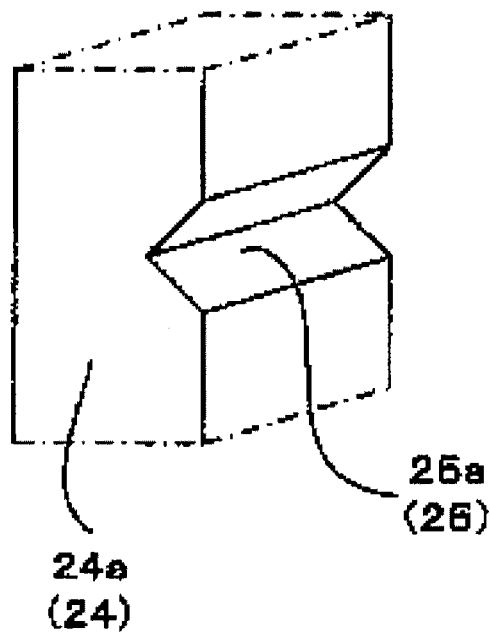
FIGS. 3A and 3B are perspective views of concrete examples of the regulating concave portion.
Figure 3B:
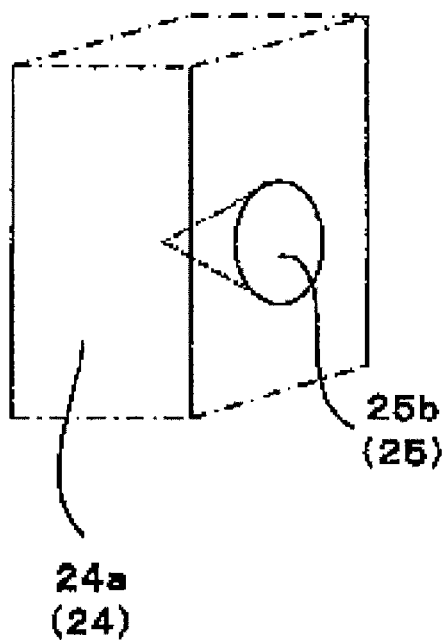

FIGS. 2A through 2C show the structure of the lamp unit 2, wherein FIG. 2A is a horizontal sectional view thereof, FIG. 2B is a transverse sectional view thereof, and FIG. 2C is a front elevational view thereof. As shown in FIGS. 2A through 2C, a discharge lamp 21 is attached to a concave reflection mirror 22. The reflection mirror 22 is attached to a holding member 23, which has an approximately rectangular flange portion 24, and a regulating concave portion 25 is formed in one of vertical sides 24a of the flange portion 24. FIGS. 3A and 3B show concrete examples of the regulating concave portion 25. Specifically, FIG. 3A shows an example of the regulating concave portion 25, which is made up of a V shaped groove 25a formed on the vertical side 24a and extends in the direction of the optical axis of the light unit 2, and FIG. 3B shows a different example of the regulating concave portion 25, which is made up of a cone hole 25b. In addition, the shape of the regulated concave portion 25 is not limited to those described above, and various modifications may be made thereto. For example, the regulating concave portion 25 may be made up of a pyramid form hole etc.

Figure 4A:
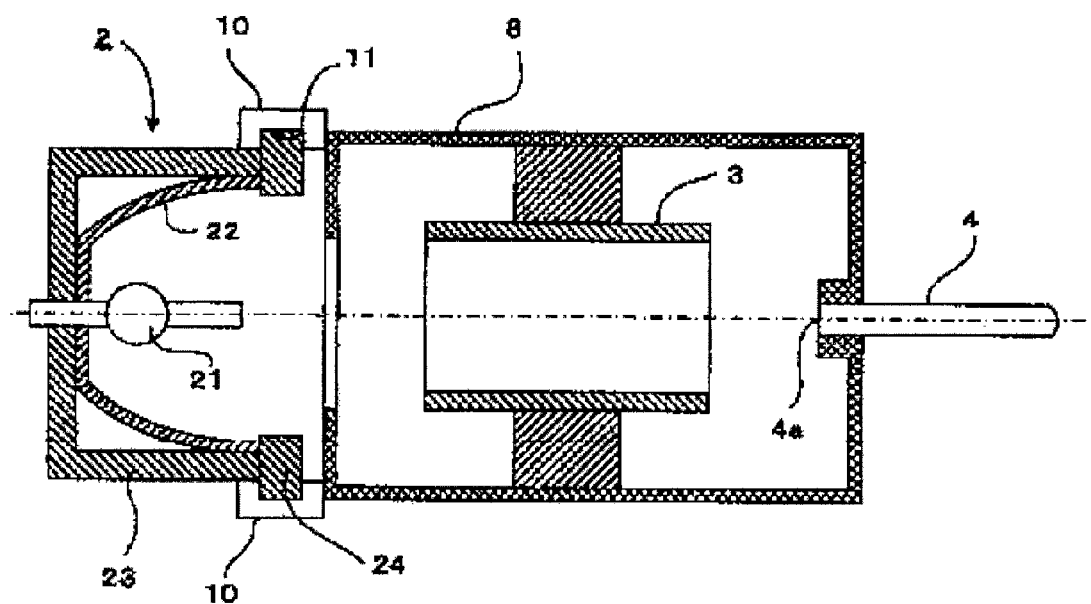
FIGS. 4A and 4B are explanatory diagrams showing a lamp unit, which is installed in a casing.
Figure 4B:
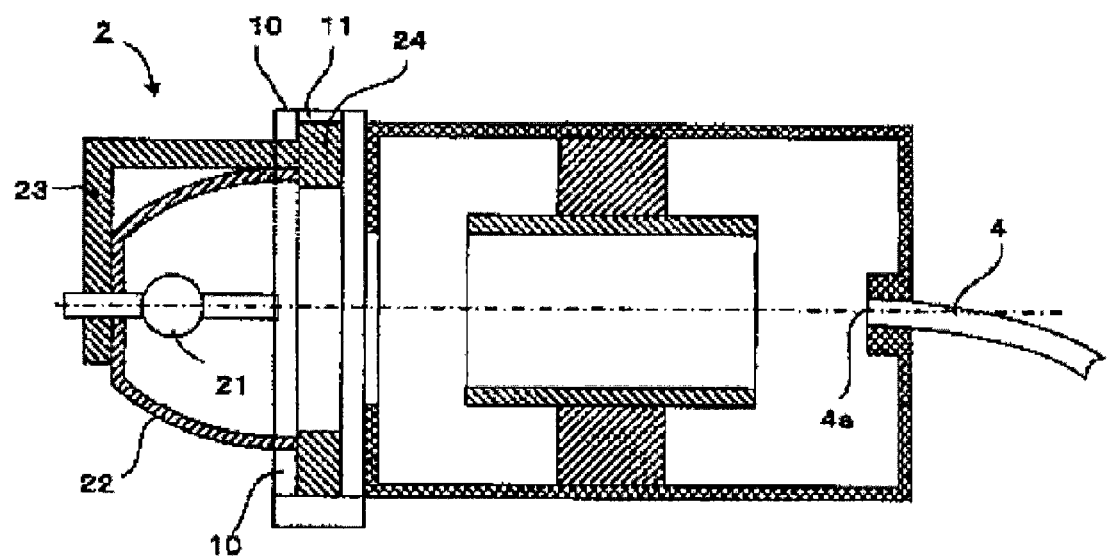

FIGS. 4A and 4B show the structure by which the lamp unit 2 is attached to the casing 8. Specifically, FIG. 4A is a horizontal sectional view thereof, and FIG. 4B is a transverse cross section thereof. A pair of guides 10 is vertically attached to the casing 8, and a guide slot 11 is formed in each of the guides 10. The discharge lamp 21 is installed in the reflection mirror 22. The flange portion 24 of the holding member 23, to which the reflection mirror 22 is attached, is vertically inserted in the guide slots 11 of the respective guides 10.

Figure 5A:
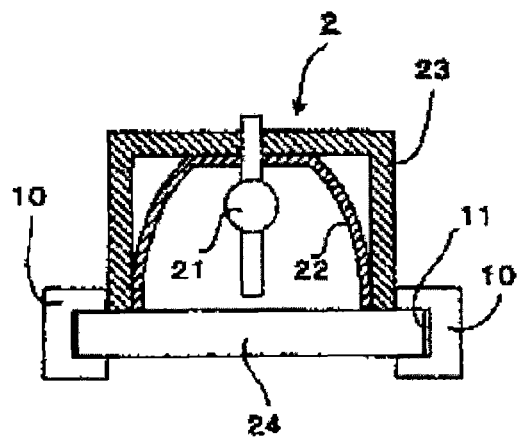
FIGS. 5A, 5B and 5C are diagrams to explain an operation, in which a lamp unit is installed in guides.
Figure 5B:
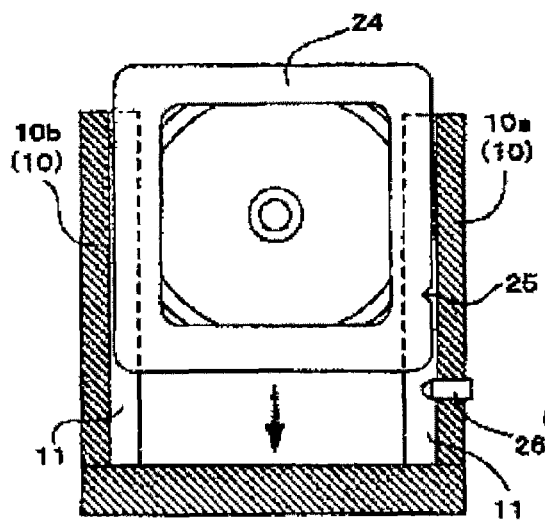
Figure 5C:
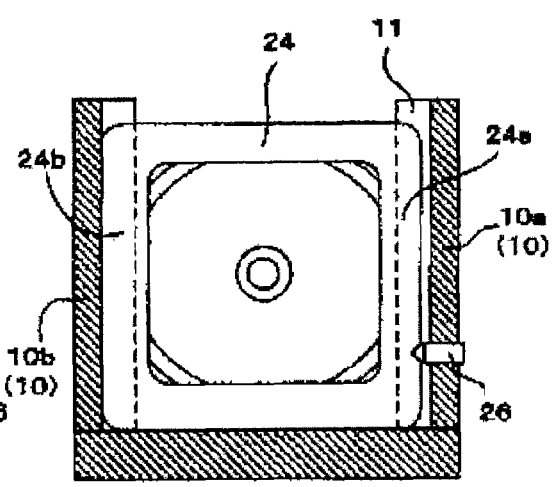
Figure 6:
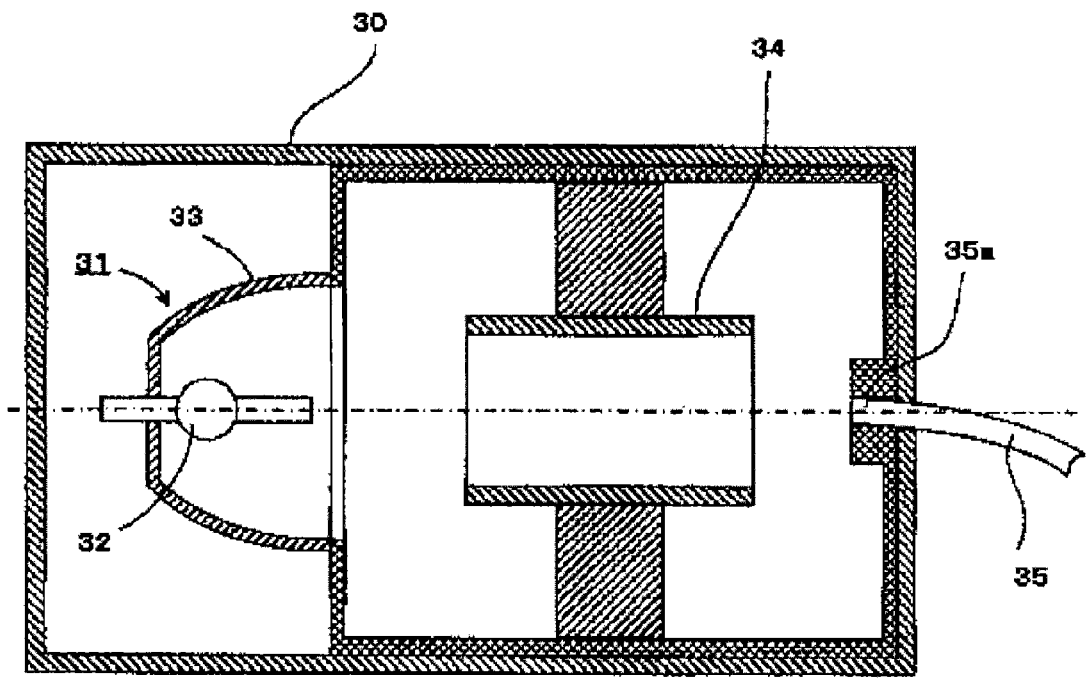
FIG. 6 is a cross sectional view of a light source apparatus according to prior art.

Details of attaching the lamp unit 2 to the casing 8 are shown in FIGS. 5A through 5C. FIG. 5A is a top plane view thereof, FIG. 5B is a front elevational view thereof during attachment, and FIG. 5C is a front view thereof when the attachment is completed. As shown in FIGS. 5B and 5C, a pressing member 26, which is pressed by a spring, is provided in one guide 10a of the pair of guides 10 provided in the casing 8. The pressing member 26 is made from, for example, a ball plunger etc. As shown in FIGS. 5A and 5B, the flange portion 24 of the holding member 23, to which the lamp unit 2 is attached, is inserted in the guide slots 11 of the pair of guides 10 from an upper part thereof. When this flange portion 24 goes down inside the guides 10 from the upper part, this flange portion 24 passes through the pressing member 26, which is provided in the one guide 10a, so as to push the pressing member 26 down. Then, when a lower side of the flange portion 24 reaches a lower part, the pressing member 26 enters the inside of the regulating concave portion 25 formed in the vertical side 24a and is engaged therewith, whereby the lamp unit 2 is fixed thereto. At this time, a side 24b opposite to the side 24a is pressed so as to be brought in contact with the other side guide 10b by the pressing member 26, whereby the flange 24 is positioned.

In addition, although in the above-mentioned embodiment the structure is configured so that the guide slots 11 are formed in the guides 10 in a vertical direction and the flange portion 24 is slidably inserted therein, in an alternative embodiment convex portions may be formed on the guides 10 in a vertical direction rather than the guide slots 11 and concave slots may be formed in the flange portion 24, so that the convex portions of the guides 10 may be inserted in the concave slots for sliding. Moreover, although in the embodiments described above the guides 10 are vertically provided and the flange portion 24 of the holding member 23 is vertically engaged therewith, the guides may be formed horizontally and the flange portion may slide horizontally with respect to the above-mentioned guides. In such a case, it is suitable to form the regulating concave portion in an upper portion of the flange portion with respect to the horizontal direction, and to provide the pressing member on the guide in the upper part so as to correspond thereto.

As described above, in the optical fiber light source apparatus, the concave reflection mirror, to which the discharge lamp is fixed, is held by the holding member which has an approximately rectangular flange portion in a front face thereof, the regulating concave portion is formed in the side of the flange portion, the guides are provided on the casing in a direction perpendicular to the optical axis, the flange portion of the holding member is slidably engaged with the guides, and the pressing member, which is pressed with a bias force toward the regulating concave portion of the flange, is provided on the guide. Accordingly, by a simple operation of engaging the flange portion of the lamp unit with the guides, and sliding it therein, the optical axis of the reflection mirror and that of the optical fiber can be certainly aligned with each other. And neither exceptional skill nor careful attention is required for the operation, and replacement of the discharge lamp and concave reflection mirror can be made by a simple action of an operator while nonetheless ensuring that the optical axes thereof are aligned with that of the optical fiber.

The preceding description has been presented only to illustrate and describe exemplary embodiments of the present optical fiber light source apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:
1. An optical fiber light source apparatus, comprising:
a casing;
a discharge lamp accommodated inside the casing;
a concave reflection mirror, that holds the discharge lamp; and
an optical fiber, configured to receive light from the concave reflection mirror,
wherein:
the concave reflection mirror is held by a holding member, the holding member has flange portion in a front face of the holding member, the flange portion including an engaging area,
a regulating concave portion is formed in a side of the flange portion,
a guide is provided on the casing in a direction perpendicular to an optical axis, the guide being complementary to the engaging area of the flange portion so that the flange portion of the holding member is slidably engaged with the guide, and
a pressing member, that is pressed with a bias force toward the regulating concave portion of the flange, is provided on the guide and is configured to engage the regulating concave portion.

2. The optical fiber light source apparatus according to claim 1, wherein a vertical guide slot is formed in the guide, and the engagement area of the flange portion of the holding member is inserted in and is engaged with the guide slot.

3. The optical fiber light source apparatus according to claim 1, wherein the regulating concave portion comprises a V-shaped groove extending along a direction of the optical axis.

4. The optical fiber light source apparatus according to claim 1, wherein the pressing member comprises a ball plunger.

5. The optical fiber light source apparatus according to claim 2, wherein the regulating concave portion comprises a V-shaped groove extending along a direction of the optical axis.

6. The optical fiber light source apparatus according to claim 2, wherein the pressing member comprises a ball plunger.

7. The optical fiber light source apparatus according to claim 1, wherein the regulating concave portion comprises a conical groove.

8. The optical fiber light source apparatus according to claim 2, wherein the regulating concave portion comprises a conical groove.

9. A casing for an optical fiber light source apparatus having a discharge lamp accommodated in the casing and an optical fiber, comprising:
   a concave reflection mirror that is held by a holding member, the holding member has flange portion in a front face of the holding member, the flange portion including an engaging area;
   a regulating concave portion that is formed on the flange portion;
   a guide that is complementary to the engaging area of the flange portion so that the flange portion of the holding member is engageable with the guide, and
   a pressing member, that is pressed with a bias force toward the regulating concave portion of the flange, is provided on the guide and is configured to engage the regulating concave portion.

10. The casing according to claim 9, wherein a vertical guide slot is formed in the guide, and the engagement area of the flange portion of the holding member is inserted in and is engaged with the guide slot.

11. The casing according to claim 9, wherein the regulating concave portion comprises a V-shaped groove extending along a direction of the optical axis.

12. The casing according to claim 9, wherein the regulating concave portion comprises a conical groove.

* * * * *